United States Patent [19]

Leber et al.

[11] Patent Number: 5,079,965

[45] Date of Patent: Jan. 14, 1992

[54] GEARBOX

[75] Inventors: Fritz Leber, Friedrichshafen; Michael Herlitzek, Eriskirch, both of Fed. Rep. of Germany

[73] Assignee: Zahnradfabrik Friedrichshafen AG, Fed. Rep. of Germany

[21] Appl. No.: 536,030

[22] Filed: Jun. 11, 1990

[30] Foreign Application Priority Data

Jul. 14, 1989 [DE] Fed. Rep. of Germany ....... 3923224

[51] Int. Cl.⁵ .......................... F16H 3/04; F16H 3/08
[52] U.S. Cl. .......................................... 74/331; 74/322; 74/325
[58] Field of Search .................. 74/331, 333, 325, 322

[56] References Cited

U.S. PATENT DOCUMENTS

| | | | |
|---|---|---|---|
| 4,106,364 | 8/1978 | Zenker et al. | 74/331 X |
| 4,145,935 | 3/1979 | Herlitzek | 74/331 |
| 4,392,391 | 7/1983 | Jameson et al. | 74/333 |
| 4,461,188 | 7/1984 | Fisher | 74/331 X |
| 4,799,395 | 1/1989 | Janiszewski | 74/331 |
| 4,813,300 | 3/1989 | Ohkubo | 74/331 X |
| 4,846,009 | 7/1989 | Paluska, Jr. | 74/331 |
| 4,864,881 | 9/1989 | Beeson et al. | 74/331 X |
| 5,014,566 | 5/1991 | Kashiwase | 74/331 |
| 5,031,473 | 7/1991 | Yumoto et al. | 74/331 X |

FOREIGN PATENT DOCUMENTS

| | | |
|---|---|---|
| 2535700 | 1/1978 | Fed. Rep. of Germany . |
| 2800267 | 3/1984 | Fed. Rep. of Germany . |
| 3427226 | 1/1986 | Fed. Rep. of Germany ........ 74/331 |
| 274151 | 12/1986 | Japan ..................................... 74/331 |
| 606749 | 5/1978 | U.S.S.R. ............................... 74/331 |
| 1541178 | 2/1979 | United Kingdom ................. 74/331 |

Primary Examiner—Leslie A. Braun
Assistant Examiner—Khoi Q. Ta
Attorney, Agent, or Firm—Davis, Bujold & Streck

[57] ABSTRACT

The invention concerns a gearbox (9). On the gearbox is front-mounted a hydrodynamic torque converter (3). The gearbox (9) has hydraulically actuatable gear clutches (17, 18, 23 and 28) which are designed structurally alike. The gears (14, 15, 16, 19, 20, 21, 22, 24, 26 and 27) are in constant engagement with each other. In order to reduce the development of noise, the gears are high and helically toothed. The gearbox is especially suited for use in vehicles in which special importance is attached to comfortable riding. Such vehicles are, for instance, passenger cars and mobile homes.

11 Claims, 1 Drawing Sheet

GEARBOX

The invention concerns a gearbox having an input shaft upon which a center gear is non-rotationally situated and two side gears on both sides adjacent the center gear are rotatably supported on the input shaft and engagable with the center gear by respective gear clutches, and a shaft paraxially aligned with respect to the input shaft and upon which are non-rotationally situated two gears which mesh with the side gears, and a gear rotatably supported on the shaft meshes with the center gear and is engagable with one of the gears by another gear clutch.

German Patent No. 25 35 700 has disclosed in gearing construction a gearbox shiftable under load in which one embodiment has three forward and three reverse gears. In order to obtain each time the same number of forward and reverse gears, this gearbox has so called directional clutches coordinated with gears rotatably situated upon two shafts extending parallel with the input shaft. In this gearbox, each two clutches, designed as double clutches having a common multi-disc carrier, are situated consecutively in the same direction. The number of equal parts is great, but the vertical distance of the input shaft from the output shaft is relatively large due to the design of the gearbox as a reversing gearbox.

In the prior art (German Patent No. 28 00 267) is further included a four-gear gearbox wherein gear clutches designed as multi-disc clutches are given the same dimensions and combined to form double clutches. In a first embodiment of this gear box, a center gear is non-rotatably connected with the input shaft. Side gears are rotatably supported on the input shaft on both sides of the center gear. The side gears are engagable with the center gear by respective gear clutches. The gears situated upon the input shaft constantly mesh with gears which are situated upon a shaft paraxially aligned in respect to the input shaft. Two gear clutches combined to form a double clutch are likewise coordinated with part of the gears of said shaft. By actuating the gear clutches, the individual gears can be shifted, no reverse being provided in the described arrangement. But this is made possible in a second embodiment of the gearbox by front-mounting a reversing gearbox. The number of reverse gears also corresponds in this construction to that of the forward gears. In this gearbox, the distance of the input shaft from the output shaft in the vertical direction is also relatively great.

Departing from the arrangement according to German Patent 28 00 267, the invention is based on the problem of providing a gearbox especially adequate for driving front-and all-wheel operated motor vehicles, in particular light commercial motor vehicles and mobile homes. A low center of gravity of the drive unit formed by engine and gearbox must exist. Together with a compact construction, the advantage of a large number of equal parts must be maintained. In addition to the stated problem, this gearbox must be especially suited, because of a low development of noise, to driving mobile homes, small buses, or other similar motor vehicles.

By virtue of the design of the gearbox according to the invention, in the first place the advantages of a large number of equal parts are kept. The gearbox has three forward gears and a reverse gear and also a pair of gears for driving an axle-drive shaft. A special advantage, in comparison to the arrangement of the prior art, is to be seen from the fact that the coordination of the input shaft with the shaft paraxially aligned with respect thereto has been preserved, the input shaft-seen in vertical direction and referred to the axle-drive shaft-is on the shaft situated lowest and accordingly is at a small distance from the axle-drive shaft. This results in that the drive unit, consisting of the input engine, the hydrodynamic torque converter and the gearbox, can be situated directly above the front axle and laterally juxtaposed thereto. This leads to a low center of gravity of the drive system which favorably affects the traveling properties. In connection with the step proposed a compact, silent gearbox especially adequate for the indicated purpose is obtained.

In the drawings, an embodiment of the invention is diagrammatically shown which is described in detail herebelow.

Figure 1:
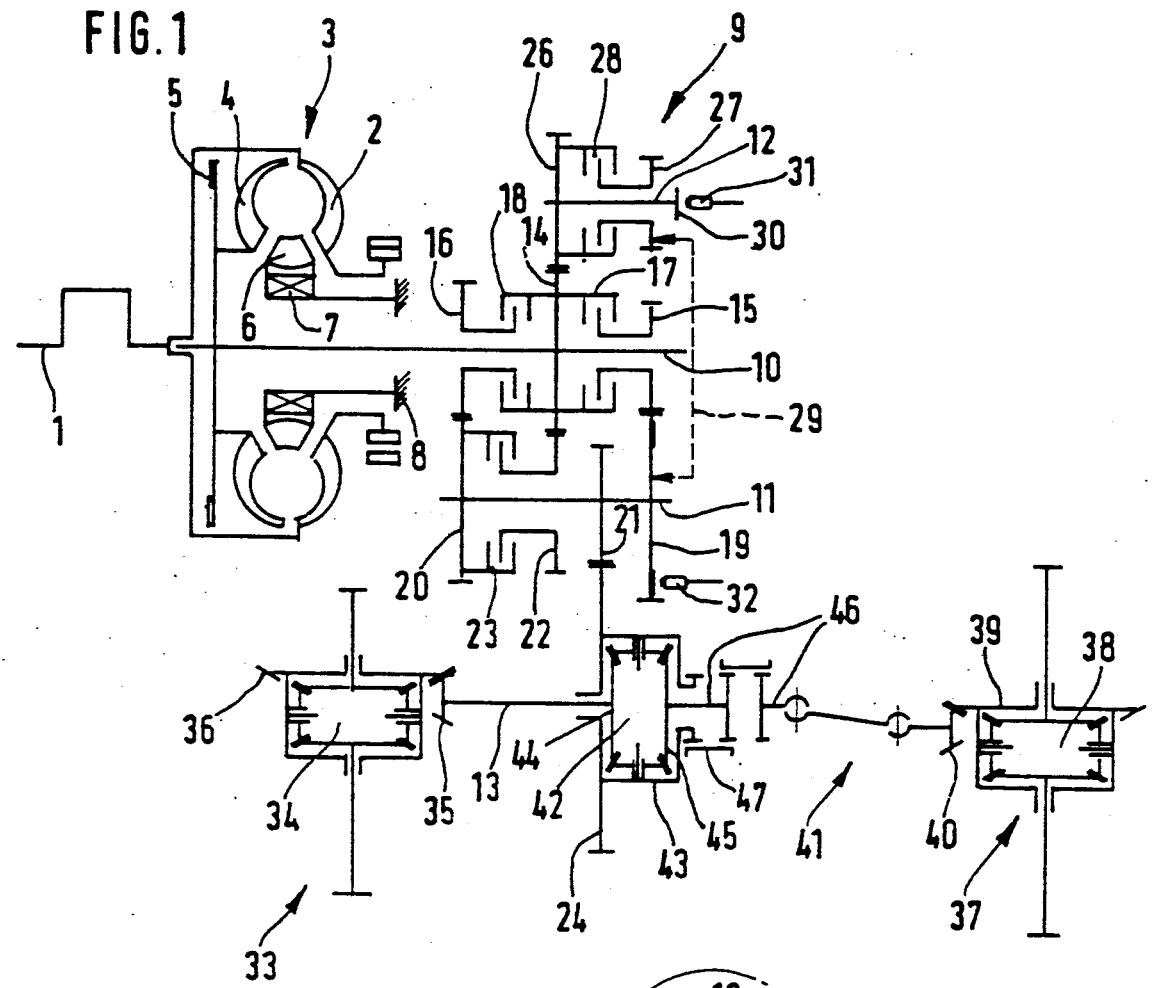
FIG. 1 shows a diagrammatic representation of the present invention.

The extensively simplified drive system shown in FIG. 1 comprises a motor drive 1 such as an internal combustion engine, which drives a pump wheel 2 of a hydrodynamic torque converter 3. The hydrodynamic torque converter 3 has a turbine wheel 4 and a torque converter clutch 5 as well as a stator 6. The stator 6 is supported by a freewheel 7 on the housing 8.

A gearbox 9 is connected to the rear of the hydrodynamic torque converter 3. The turbine wheel 4 is non-rotationally connected with an input shaft 10. The gearbox 9 has another (drive) shaft 11 paraxially aligned in respect to the input shaft and a reversing shaft 12. An axle-drive shaft 13 is also present. The reversing shaft 12 and the axle-drive shaft 13 extend likewise paraxially with respect to the input shaft 10.

A center gear 14 is non-rotationally situated on the input shaft 10. Two side gears 15 and 16 are rotatably supported on the input shaft 10 on both sides of the center gear 14. The side gear 15 by a gear clutch 17 and the side gear 16 by a gear clutch 18 are engagable with the center gear 14. Hydraulically actuatable multi-disc clutches designed structurally alike are used as gear clutches 17 and 18. This reduces the cost of production.

The shaft 11 has gears 19 and 20 as well as gear 21 non-rotatably connected therewith. It is advantageous to design the shaft 11 and the gear 21 as one piece. The gear 20 can be mounted on the shaft by a suitable drag connection (spline). For the non-rotational connection of the gear 19 with the shaft 11, a slip joint proves advantageous. In addition to the gears 19, 20 and 21, a gear 22 is rotatably supported on the shaft 11. The gear 22 can be coupled with the gear 20 via an additional gear clutch 23. The gear clutch 23 is likewise designed as hydraulically actuatable multi-disc clutch and has the same construction as the multi-disc clutches 17 and 18.

A gear 24, which is in constant meshing connection with the gear 21 of the shaft 11, is rotatably supported upon the axle-drive shaft 13.

For the rest, the center gear 14 of the input shaft 10 meshes with the gear 22 of the shaft 11, the side gear 15 on the input shaft 10 with the gear 19 of the shaft 11, and the side gear 16 on the input shaft 10 with the gear 20 of the shaft 11.

The first gear is introduced by engaging the gear clutch 17. The power is transmitted via the side gear 15, the gear 19 and the gears 21 and 24. If the gear clutch 18 is actuated, the second gear is switched on. The power is transmitted via the side gear 16 and the gear 20, as well as the gears 21 and 24. By engaging the gear clutch 23, a third gear is introduced. The power flows then via the center gear 14 and the gear 22 as well as the gears 21 and 24. Let it be supplementary observed that only one of the gear clutches 17, 18 and 23 is actuated at a time.

A gear 26 is non-rotational connected with the reversing shaft 12. The former is in constant meshing connection with the center gear 14 of the input shaft 10. A gear 27, engagable via a gear clutch 28 with the gear 26, is further rotatably supported on the reversing shaft 12. The gear 27 meshes with the gear 19 of the shaft 11, which is indicated by the dotted line 29.

For lowering the cost of production, the gear clutch 28 has the same construction as the gear clutches 17, 18 and 23. By actuating the gear clutch 28 in the direction of engagement, the reversing gear is introduced. The power flows then via the center gear 14 of the input shaft, the gear 26 of the reversing shaft, the gear 27 of the reversing shaft which meshes with the gear 19 of the shaft 11, and the gears 21 and 24.

The reversing shaft 12 is equipped with a signal disc 30 which is coordinated with a sensor 31 for determining the speed. The sensor 31 serves to detect the driving speed, that is, the speed of the input shaft 10.

Another sensor 32 is provided for detecting the output speed, that is, the speed of the shaft 11. Both sensors 31 and 32 are situated in structurally favorable places. In this case, the place is the junction between the gearbox housing (not shown) and the control box (likewise not shown) directly screwed on.

Determining the input and output speeds allows a speed-dependent actuation of the gear clutches, and an optimal intersection control, in particular, being possible.

A front axle 33 has a cross differential 34 of conventional construction. The end of the axle-drive shaft 13, which appears to the left in the drawing, has an input pinion 35 which is operative connection with a bevel gear 36 of the cross differential 34.

In an exclusively front-driven motor vehicle, the gear 24 is non-rotationally connected with the axle-drive shaft 13.

In the embodiment shown, a rear axle 37 is additionally driven which, similarly to the front axle 33, has a cross differential 38. A bevel gear 39 is driven by an input pinion 40 of the drive line 41.

For operative connection of the front and rear axles 33 and 37, the arrangement has a longitudinal differential 42 whose differential body 43 is non-rotationally connected with the gear 24. In this case, the gear 24 is designed as an idler gear and the axle-drive shaft 13 is non-rotationally connected with an axle bevel gear 44 of the longitudinal differential. The opposite axle bevel gear 45 is non-rotationally connected with a separately designed axle-drive shaft 46. A gear change sleeve 47 which—as it can be seen from the drawing—can assume two gear positions, is provided for optional engagement or disengagement of the input for the rear axle 37.

Figure 2:
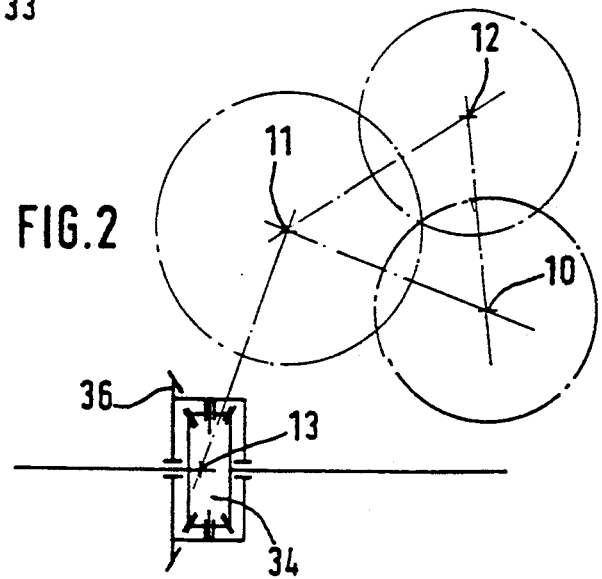
FIG. 2 shows a diagrammatic representation of the spatial coordination of the three axles.

The extensively simplified illustration according to FIG. 2 exclusively serves the purpose of clarifying the spatial coordination of the shaft 11, the reversing shaft 12 and the axle input shaft 13 with the input shaft 10. As seen in longitudinal direction of the shafts, the longitudinal central axles of the input shaft 10, of the shaft 11 and of the reversing shaft 12 are at the vertices of a substantially equilateral triangle. The input shaft 10 has in relation to the axle-drive shaft 13 (and thus to the front axle 33) the smallest vertical distance. This distance becomes especially small when the axle drive shaft 13 (and thus the cross differential 34 of the front axle 33) are laterally offset with respect to the input shaft 10.

All the gears 14, 15, 16, 19, 20, 21, 24, 26 and 27 of the gear box 9 are helically cut. Said gears have an additional tooth depths in the range of more than double to less than triple of their tooth modules. Both the helical and high cut features of the gears, essentially contribute to reducing the noise emission of the gearbox 9.

Summarizing, with the above explained arrangement, the following advantages can be substantially obtained. The gearbox 9 distinguishes itself by its compact construction. All the gear clutches 17, 18, 23 and 28 are designed structurally alike, which reduces the cost of production. By virtue of the spatial coordination of the input shaft 10 and the remaining shafts 11, 12 and 13, the complete drive unit consisting of the motor input 1, the hydrodynamic torque converter 3 and the gearbox 9 can be situated directly over the front axle 33 and laterally adjoining it. The consequence of this is a low center of gravity. All the shafts distinguish themselves by a short length which results in a sturdy construction. This feature also contributes to reducing the development of noise. A drive unit having the above features and the advantages resulting therefrom is suited to a special extent to drive a front- and all-wheel driven vehicle where a special value is to be attached to riding in comfort. Such a vehicle can be in particular a mobile home.

Reference Numerals 1 input
2 pump wheel
3 hydrodynamical torque converter
4 turbine wheel
5 torque converter clutch
6 stator
7 freewheel
8 housing
9 gearbox
10 input shaft
11 shaft
12 reversing shaft
13 axle drive shaft
14 centre gear
15 side gear
16 side gear
17 gear clutch
18 gear clutch
19 gear
20 gear
21 gear
22 gear
23 gear clutch
24 gear
26 gear
27 gear
28 gear clutch
29 dotted line
30 signal disc
31 sensor
32 sensor
33 front axle
34 cross differential
35 input pinion
36 bevel gear
37 rear axle 38 cross differential
39 bevel gear
40 input pinion
41 drive line
42 differential (longitudinal)
43 differential body
44 axle bevel gear
45 axle bevel gear
46 axle drive shaft
47 gear change sleeve

We claim:

1. A gear box (9) for a vehicle having an input shaft (10) upon which a center gear (14) is fixedly supported, two side gears (15, 16) being rotatably supported on said input shaft (10), one said side gear being located on each side of said center gear (14) and each said side gear (15, 16) being engagable with said center gear (14) by respective input shaft gear clutches (17, 18), a drive shaft (11) being paraxially aligned relative to said input shaft (10) and having two gears (19, 20) fixedly supported on said drive shaft (11), said two fixed gears (19, 20) of said drive shaft (11) meshing with said two side gears (15, 16) of said input shaft (10), and a further gear (22), meshing with said center gear (14), being rotatably supported on said drive shaft (11) and being engagable with one of said fixed gears (19, 20) of said drive shaft (11) by a drive shaft gear clutch (23), wherein an additional gear (21), operatively connected with a gear (24) of an axle-drive shaft (13), is fixedly supported on said drive shaft (11), and a gear (26) is fixedly supported on a reversing shaft (12) paraxially aligned with respect to said input shaft (10), said gear (26) of said reversing shaft (12) meshes with said center gear (14) of said input shaft (10), and a gear (27), rotatably supported upon said reversing shaft (12), is engagable by a reversing shaft gear clutch (28) and meshes with one of said fixed gears (19, 20, 21) of said drive shaft (11).

2. A gearbox according to claim 1, wherein said additional gear (21) of said drive shaft (11) is situated between said rotatable gear (22) and one of said two fixed gears (19) and said rotatable gear (27) of said reversing shaft (12) meshes with said one of said two fixed gears (19) of said drive shaft (11).

3. A gearbox according to claim 1, wherein said additional gear (21) of said drive shaft (11) is situated between said rotatable gear (22) and one of said two fixed gears (19).

4. A gearbox according to claim 1, wherein said gears (14, 15, 16, 19, 20, 22, 24, 26 and 27) supported by said input shaft, said drive shaft and said reversing shaft (10, 11, 12) are helically and high toothed gears.

5. A gearbox according to claim 4, wherein said gears (14, 15, 16, 19, 20, 22, 24, 26 and 27) supported by said input shaft, said drive shaft and said reversing shaft (10, 11, 12) have toothed heights in the range of from twice to three times their tooth module.

6. A gearbox according to claim 1, wherein sensor means (31, 32) are coordinated with said reversing shaft (12) and with one of said fixed gears (19) of said drive shaft (11) for determining the rotational speeds of those components.

7. A gearbox according to claim 1, for driving an all-wheel motor vehicle in which power is conveyed via a cross differential (34, 38) of at least one axle (33, 37) of the vehicle and a longitudinal differential (42), wherein said gear (24) of said axle-drive shaft (13) is fixedly connected with a differential body (43) of said longitudinal differential (42) and is rotatably supported on said axle-drive shaft (13), and said axle-drive shaft (13) is connected at one end (35) thereof with said cross differential (34) of the at least one axle (33) and at the other end thereof with an axle bevel gear (44) of said longitudinal differential (42).

8. A gearbox according to claim 1, wherein said input shaft (10), when mounted on the vehicle, is located adjacent said axledrive shaft (13) and is situated laterally offset with respect thereto.

9. A gearbox according to claim 7, wherein the at least one axle is a front axle of the vehicle and a second axle bevel gear (45) of said longitudinal differential (42) is fixedly connected to a drive shaft (41) for driving a cross differential (42) of a rear axle (37) of the vehicle.

10. A gearbox according to claim 1, further including a drive (1) for driving said input shaft (10), wherein a hydrodynamic torque converter (3) with torque converter clutch (5) is connected at an input of said input shaft (10) of said gearbox (9) and said torque converter clutch (5) allows the transfer of driving power directly from the drive (1) to said input shaft (10).

11. A gearbox according to claim 1, wherein drive power is conveyed from said gearbox (9) to an output axle of the vehicle via at least one cross differential located in a drive path between said gear (24) of said axle-drive shaft (13) and said output axle.

* * * * *

UNITED STATES PATENT AND TRADEMARK OFFICE
CERTIFICATE OF CORRECTION

PATENT NO. : 5,079,965

DATED : January 14, 1992

INVENTOR(S) : Fritz LEBER & Michael HERLITZER

It is certified that error appears in the above-identified patent and that said Letters Patent is hereby corrected as shown below:

Column 6, line 29 change "axledrive" to --axle-drive--.

Signed and Sealed this

Eleventh Day of May, 1993

Attest:

MICHAEL K. KIRK

*Attesting Officer*     *Acting Commissioner of Patents and Trademarks*

UNITED STATES PATENT AND TRADEMARK OFFICE
CERTIFICATE OF CORRECTION

PATENT NO. : 5,079,965

DATED : January 14, 1992

INVENTOR(S) : Fritz Leber, et al

It is certified that error appears in the above-identified patent and that said Letters Patent is hereby corrected as shown below:

Column 6, line 4 delete "and high".

Signed and Sealed this

Twenty-fourth Day of August, 1993

*Attest:*

*Attesting Officer*

BRUCE LEHMAN

*Commissioner of Patents and Trademarks*